Patented Aug. 7, 1945

2,381,411

UNITED STATES PATENT OFFICE 2,381,411

PROTECTING SEEDS AND PLANTS FROM PESTS

John P. Remensnyder, Metuchen, N. J., assignor, by mesne assignments, to Heyden Chemical Corporation, New York, N. Y., a corporation of Delaware No Drawing. Application March 11, 1940, Serial No. 323,383

2 Claims. (Cl. 167—38)

My present invention relates to methods and compositions primarily intended for protecting seeds against various pests that are likely to infest and injure them, both before and after planting; and which may also be used for protecting foliage, fruits and tissues of established forms of vegetable life from pests that are likely to damage them.

A primary object of my invention is to provide for such purposes a method and a composition that is well adapted for coating seeds, and which composition is characterized by odors or tastes that are so pronounced, and so repulsive, that birds, animals and other pests will not eat seeds protected therewith. As a result, few, if any, thus-protected seeds will be eaten or injured and pests will be driven away.

In this connection, it is to be noted that there are various tarry oils that have been used for protecting seeds from damage after planting, especially from graminivorous birds; but such oils have been embodied in solutions in which the seeds are dipped, and their use is attended by various inherent disadvantages. For example, in such solutions the adhesive tarry oil constituents are practically insoluble in water; they operate to seal the surface of the seed and prevent the seed from taking up moisture sufficient for germination, thereby seriously retarding germination and lowering germination percentage.

The compositions for use in accordance with the present invention embody various important characteristics in novel combination. One feature of such compositions is the employment of a repellent that is adhesive and practically insoluble in water, thereby adapting it for coating the seeds. Another important feature is the combination of such repellent with a wettable, water-absorbent material, to provide a coating adapted to permit absorption therethrough of sufficient water to ensure approximately normal seed germination rates and normal germination percentages. The composition for use in accordance with my invention, which has all of the above specified repellent qualities, is prepared in the form of an adherent dust which is adapted to form a wettable, water-permeable, protective coating on the seed or growing vegetation, either when applied dry or in the form of a liquid suspension.

In have found that adhesive, non-wettable repellent liquids, such as wood-tar oil, and its fractions can have their adhesive, water-insoluble qualities suitably modified, without destroying their inherently repellent qualities, by properly incorporating them with absorbent, inert, water-insoluble, water-absorbent materials, such as clays, bentonite, talc, pyrophyllite, infusorial earth and the like, in proportions suitable for forming therefrom a dust having all the desired qualities including adhesiveness sufficient for forming a good, water-insoluble coating which is water-permeable so as not to interfere with normal germination.

Such dry dust may be formed by spraying the adhesive, non-soluble repellent agent into the pulverized absorbent material, while stirring the mixture. The resultant composition is then milled and sifted to fine, dry-dust form.

Such dry dust composition may be used as such to coat seeds or foliage, either alone or in admixture with dry forms of insecticides or fungicides; or with wettable or soluble forms thereof, by mixing them in a liquid having my above-described dust composition in suspension.

In the above and other respects, my dust composition is free from various disadvantages attendant on the use of the above-described tarry liquid solutions. For instance, the dust is readily usable on small seeds where the liquid would be impractical. Other cases where the above-described dust, or the method of making it, would be particularly suitable, include those where a dry disinfectant is to be added; or where a solid repellent not readily wettable by water is used; or where such repellent is not adhesive enough to form a suitable coating on the seed or plant.

On the other hand, where suspensions of solid insecticides or fungicides are used as sprays or dips, there are times when it is very desirable to have an odoriferous repellent agent of a wettable adhesive nature which may be added to the liquid of such sprays or dips; and for such cases my odoriferous dust composition is well adapted for addition to such suspensions.

Examples of dry dust compositions for use in the practice of my invention, which can be prepared by the above-described spraying, mixing, and other treatments, include the following:

*Example I.*—Ten (10) parts of wood-tar oil, as the repellent, and 90 parts of dry pulverized clay, as the absorbent. Such dry dust may be used as a repellent to coat seeds such as corn, or on foliage, to repel birds and other pests; or in aqueous suspension as a spray or dip.

*Example II.*—In making the repellent dust composition as described in Example I, the mixture may be milled with 5 parts of a fungicide, such as mercurized para-oxynaphthoic acid. The resultant product may be used as above and possesses the dual function of pest repellent and disinfectant against pathogenic organisms of the soil.

*Example III.*—The repellent dust described in Example I may be mixed, in equal parts, with lead arsenate and used as a combination repellent and insecticide, in the form of dry dust, or in aqueous suspension.

*Example IV.*—In Example III, calcium arsenate may be substituted as the insecticide.

*Example V.*—The dry dust composition described in Example I may be mixed with copper carbonate and used as a combined repellent and fungicide.

While the above examples are based on a primary formula specifying wood-tar oil as the repulsive, adhesive, water-insoluble element, and clay as the absorbent for modifying the adhesive and water-insoluble qualities in the mixture, it will be obvious that substitutions and equivalents include not only those specified elsewhere in the specification, but also other repellent liquids, or mixtures thereof, the suitability of which will be recognized by those skilled in the art.

At present, wood-tar oil is preferred, one reason being that it seems to combine all the desired qualities in a very satisfactory degree. Moreover, those wood-tar oils which I have used, seem to stimulate germination and growth of the seedling; possibly because of the presence of acetic compounds which are common constituents of wood oil; but it is not easy to prove the extent or even the existence of such specific effect, because germination and growth may involve so many other factors.

It will be noted that my coating material has the primary elements intimately incorporated in the particles of the dry dust, so that when said dust is used in suspension in water or an equivalent evaporatable liquid, the subsequent evaporation on the seed or other vegetation will leave the dust in the form of a water-permeable coating such as above described.

For special uses, either dry or in suspension, it will be obvious that certain appropriate spreaders, adhesives or other supplemental or modifying elements, may be added either during manufacture or afterwards, without departure from the spirit of my invention.

I claim:

1. A method of protecting seeds from birds and other animal pests without substantially affecting the germination characteristics of said seeds, which comprises applying to said seeds a pest-repellent dust composition composed essentially of a preponderant proportion of a finely divided absorbent earth and a pest-repellent wood-tar oil.

2. A method of protecting seeds from birds and other animal pests without substantially affecting the germination characteristics of said seeds, which comprises applying to said seeds a pest-repellent dust composition composed essentially of a finely divided absorbent earth selected from the group consisting of clays, bentonite, talc, pyrophyllite and infusorial earth and approximately 10 per cent by weight of a pest-repellent wood-tar oil.

JOHN P. REMENSNYDER.